Jan. 14, 1969  MASAO HARADA ETAL  3,421,313
LINK CHAIN
Filed Aug. 17, 1967
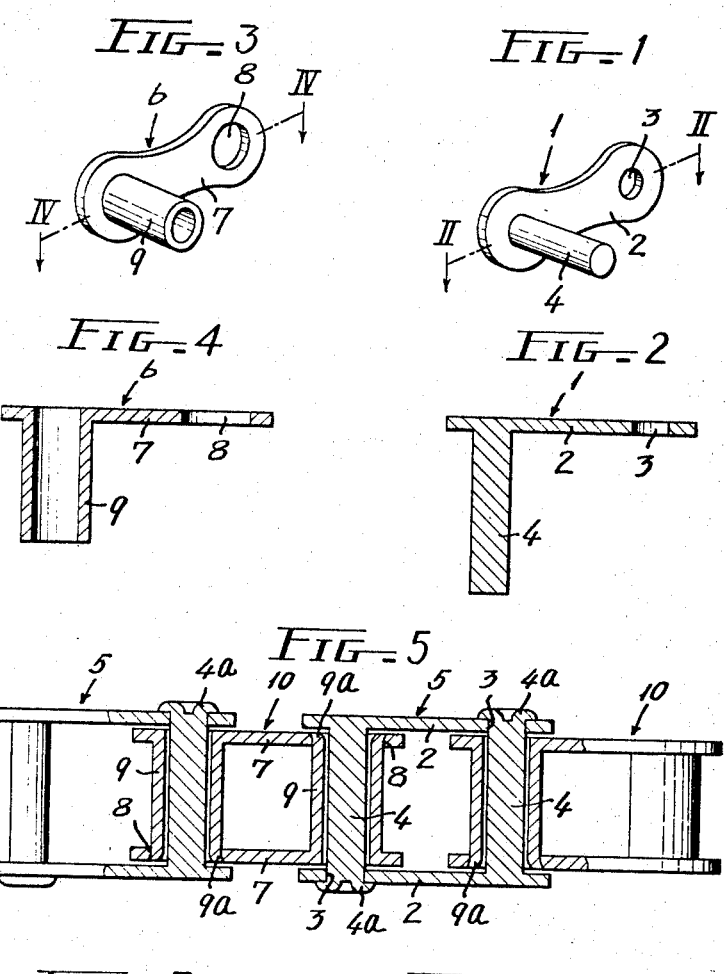

United States Patent Office 3,421,313
Patented Jan. 14, 1969

3,421,313
LINK CHAIN
Masao Harada, Kitaadachi-gun, Mitoshi Kai, Miyazaki-gun, and Yasuyuki Sagawa, Kita-Adachi-gun, Japan, assignors to Honda Giken Kogyo Kabushiki Kaisha, Tokyo, Japan
Filed Aug. 17, 1967, Ser. No. 661,288
Claims priority, application Japan, Aug. 18, 1966, 41/77,548
U.S. Cl. 59—78                                                10 Claims
Int. Cl. F16g *13/06;* F16g *13/08;* F16g *13/02*

ABSTRACT OF THE DISCLOSURE

A link chain in which a plurality of pin units and a plurality of bush units are connected in alteration, each pin unit being constituted by a pair of opposed link members each of which is constructed as a plate with an opening at one end and an integral pin at the other end, the bush units each being constituted by a pair of opposed link members each of which is constructed as a plate with an opening at one end and an integral bushing at the other end secured in the opening of the opposed bush link member and receiving an associated pin of a pin link member which in turn is secured in the opening of the other pin link member of the respective pin unit.

Brief summary of the invention

The present invention relates to a link chain and in particular to link members constituting the chain.

According to the present invention, there is provided a pin link member which comprises a link plate having at one end a pin opening therethrough and at its other end an integral pin projecting laterally therefrom. The link member can be manufactured from a piece of wire or rod by means of cold forging or the like. Two of the link members are arranged in parallel opposition and are assembled together in such a manner that the pin of each member is inserted in the corresponding pin opening of the other member, and is connected therewith to form a pin link member assembly unit.

In further accordance with the present invention, there is also provided a bush link member which comprises a link plate having at one end a bush opening therethrough and at its other end an integral bushing projecting laterally therefrom. The bush member can be also manufactured from a piece of wire or rod by cold forging or the like in almost the same manner as the pin link member. Two of the bush members are arranged in parallel opposition and are assembled together in almost the same manner as the pin link members to form a bush link member assembly unit.

To obtain a link chain of any desired length, it is usual to connect a plurality of the pin link member assembly units as mentioned above and a plurality of the bush link member assembly units as mentioned above in series in alternate relationship. It is possible, however, that either a pin link member assembly unit or a bush link member assembly unit can be substituted by a conventional one wherein link plates and pins or bushes are separately preassembled.

It should be noted that the link member can be modified so that the link plate thereof is reduced in width in the region between the pin and its opening or between the bushing and its opening, whereby the weight can be decreased.

Brief description of the drawing

FIGURE 1 is a perspective view of a pin link member according to the present invention;

FIGURE 2 is a sectional view taken along the line II—II in FIG. 1;

FIGURE 3 is a perspective view of a bush link member according to the present invention;

FIGURE 4 is a sectional view taken along the line IV—IV in FIG. 3;

FIGURE 5 is a top plan view, partly in section, of a link chain;

FIGURE 6 is a perspective view of a modification of the pin link member shown in FIG. 1; and FIGURE 7 is a perspective view of a modification of the bush link member shown in FIG. 3.

Detailed description

As seen in the drawing, numeral 1 denotes a pin link member according to the present invention, which comprises, as best seen in FIGS. 1 and 2, a link plate 2 having at one end a pin opening 3 therethrough and at its other end an integral pin 4 projecting laterally therefrom. The link member 1 can be manufactured from wire or rod material by cold forging or pressing or the like in such a manner that the material is bent at one end at right angles to form the pin 4 and the remainder portion of the link member is pressed flat to form the link plate 2 which is larger in width at both ends thereof. Two of the pin link members 1 are arranged in parallel opposed relation and are assembled together in such a manner that the pin 4 on each member 1 is inserted in the pin opening 3 on the other member. The pin is secured in each opening, for example, by calking or upsetting its top end 4*a*, whereby there is provided a pin link member assembly unit 5. The pins may also be detachably secured in the openings of the associated link members by any suitable means such as circlips or the like.

In further accordance with the present invention, there is also provided a bush link member 6 which comprises, as best seen in FIGS. 3 and 4, a link plate 7 having at one end a bush opening 8 therethrough and at its other end an integral bushing 9 which projects laterally therefrom. The bush link member 6 can be manufactured from wire or rod material by means of cold forging or pressing or the like, as in the case of the pin link member 1. Two bush link members 6 are arranged in parallel opposed relation, as shown in FIG. 5, and are assembled together in such a manner that each bushing is inserted in a corresponding bush opening 8 and is secured therewith, for example, by upsetting its top end 9*a*, whereby there is provided a bush link member assembly unit 10.

A number of the pin link member assembly units 5 and a number of the bush link member assembly units 10 are connected in series in alternating relation in such a manner that each pin 4 is inserted in the adjacent bushing 9 before upsetting of the pin as shown clearly in FIG. 5, whereby there may be obtained any desired link of a link chain.

With the above arrangement either one of the two kinds of assembly units 5 and 10 may be substituted by a conventional assembly unit wherein the link plates and pins or bushes have been separately prepared previously.

The pin link member 1 can be modified in such a manner that the link plate 2 thereof is comparatively large in width only at its pin opening portion, as shown in FIG. 6, whereby the link member can be decreased in weight and material cost. Similarily, the bush link member 6 can be modified in such a manner that the link plate 7 thereof is large in width only at its bush opening portion, as shown clearly in FIG. 7.

The link member according to the present invention is so formed that the link plate is integral with the pin or the bushing. Accordingly, the link member is advantageous in comparison with the conventional one, wherein a link plate and a pin or bushing are separately produced and then assembled together, in that the connecting portion between the link plate and the integral pin or the bushing is large in strength and not subject to strength reduction due to connecting members. Moreover, a chain assembling operation can be effected simply and at high efficiency. Additionally, the link member can be obtained, for example, by a cold forging operation easily and economically, whereby the manufacturing cost of a link chain is lowered.

What is claimed is:

1. A link chain which comprises a plurality of pin link member assembly units and a plurality of bush link member assembly units connected in series in alternate relationship, each unit comprising a pair of opposed link mmebers assembled together, each member comprising a link plate having one end with an opening therein and an opposite end with an integral projection extending laterally and secured in the opening of the associated link member.

2. A link chain as claimed in claim 1 wherein said pin link units and bush link units are assembled together by engagement of the projections of the pin link members in the projections of the bush link members.

3. A link chain as claimed in claim 1 wherein the link members of the pin link units each are constituted by said link plate, said projection being a pin integral with said plate and extending laterally therefrom.

4. A link chain as claimed in claim 3 wherein each pin link member includes a portion of enlarged width at said end with the opening, and has a substantially uniform width through the remainder of its length.

5. A link chain as claimed in claim 4 wherein each pin link member is a cold forged one-piece body.

6. A link chain as claimed in claim 1 wherein the link member of the bush link units each is constituted by said link plate, said projection being a tubular bushing integral with said plate and extending laterally therefrom.

7. A link chain as claimed in claim 6 wherein each bush link member includes a portion of enlarged width at said end with the opening, and has a substantially uniform width for the remainder of its length.

8. A link chain as claimed in claim 7 wherein each bush link member is a cold forged one-piece body.

9. A link chain as claimed in claim 1 wherein the projections on the link members of the bush units are tubular bushings, and the projections on the link members of the pin units are pins rotatably fitted in respective bushings of the bush units.

10. A link chain as claimed in claim 9 wherein the link plates of the pin units lie on the outside of the link plates of the bush units in overlapping relation.

References Cited

UNITED STATES PATENTS

| | | | |
|---|---|---|---|
| 1,448,663 | 3/1923 | Hoya | 57—78 |
| 2,447,921 | 8/1948 | Thomas | 59—35 |
| 3,155,225 | 11/1964 | Krekeler | 74—250 |

RICHARD J. HERBST, *Primary Examiner.*

G. P. CROSBY, *Assistant Examiner.*

U.S. Cl. X.R.

59—84; 74—250